W. W. Graham,
Hand Hole Cap for Steam Engines.
No. 110,647. Patented Jan. 3, 1871.

Witnesses.
S. N. Piper.
L. N. Miller.

Wm. W. Graham.
by his attorney
R. H. Eddy

N. PETERS, PHOTO-LITHOGRAPHER, WASHINGTON, D. C.

UNITED STATES PATENT OFFICE.

WILLIAM W. GRAHAM, OF BOSTON, MASSACHUSETTS, ASSIGNOR TO HIMSELF AND JAMES S. PARSONS, OF WINDHAM, CONNECTICUT.

IMPROVEMENT IN HAND-HOLE CAPS FOR STEAM-BOILERS.

Specification forming part of Letters Patent No. 110,647, dated January 3, 1871.

*To all whom it may concern:*

Be it known that I, WILLIAM W. GRAHAM, of Boston, of the county of Suffolk and State of Massachusetts, have invented a new and useful Improvement in Hand-Hole Caps for Steam-Boilers; and I do hereby declare the same to be fully described in the following specification and represented in the accompanying drawings, of which—

Figure 1:
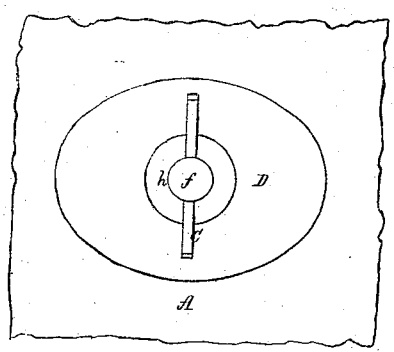
Figure 4:
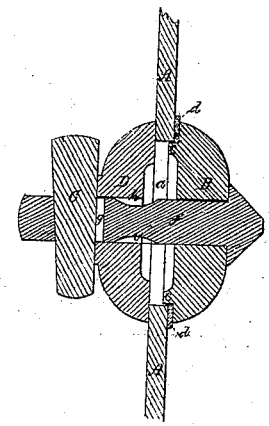
Figure 2:
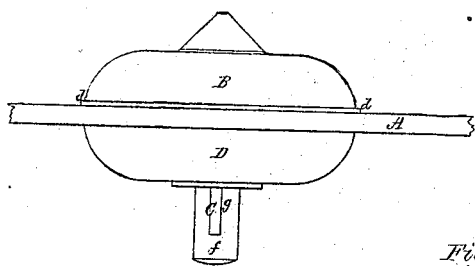
Figure 3:
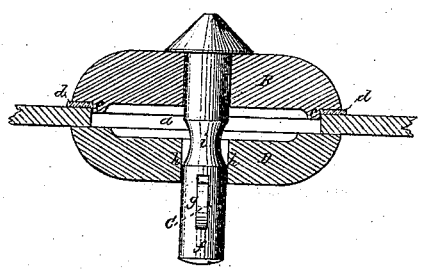
Figure 5:
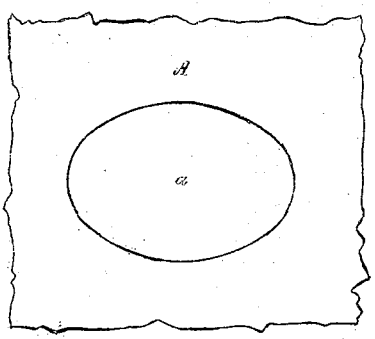

Figure 1 is a front elevation; Fig. 2, a top view; Fig. 3, a horizontal section, and Fig. 4 a vertical section of part of a boiler-plate with one of my improved caps applied to a hand-hole thereof. Fig. 5 is a representation of the plate and hand-hole without the cap.

The hand-hole (shown at $a$ in the plate A) is elliptical or oblong in form, in order to enable the head or the rear or inner covering-plate, B, to be passed through the hole and into the boiler, the said covering-plate having its transverse and corrugate axes longer than those of the hand-hole, which correspond with or are a little greater than those of a flange, C, arranged on and so as to project from the inner face of the said plate B in manner as represented. Extending around the said flange is a packing or ring, $d$, of india-rubber or other suitable material. A shank or bolt, $f$, provided with a mortise, $g$, made down through it, projects from the covering-plate B at its center. This shank has a broad groove, $i$, turned in it between the hole $g$ and the inner face of the plate. Such shank goes through another oblong or elliptical covering-plate D to cap and cover the hand-hole on the outer face of the plate A, in which such hole may be, such cover D having a hole, $h$, at its center to receive the shank. A wedge or key, C, driven down through the mortise $g$, serves, with the shank $f$, to draw the two cap-plates toward each other and fast against the hand-hole plate. A hand-hole cap, as commonly made and used, has a male screw cut on its shank, such shank going through a spider or legged plate and receiving a nut to screw against such legged plate. The spider or legged plate has to be used, in order to enable the shank to be seized and held by an implement while the nut is being turned. The legs of the plate at their feet rest against the boiler and about the hand-hole, thus leaving such hand-hole open and exposed to the action of the flame and smoke while coursing by the hole. The consequence is the screw-shank, the nut, the legged plate, and the hand-hole sooner or later become burned or injured or oxidated, so as often to render it difficult, if not impossible, to remove the nut or separate the parts, the attempt often resulting in breakage of the shank or destruction of its thread. With my improved hand-hole cap the hand-hole, as well as most of the shank, is completely covered and protected by the outer plate, the said outer plate, when in use, serving as a cover to the hole.

In order that the shank may be made of sufficient strength to receive the key and resist its strain and enable the head or plate B to be passed through the hand-hole, as it has to be in order to introduce it into the boiler and against the said hole, I make the groove, as described, in the shank. The key can easily be driven out of the key-hole or mortised at any time when necessary. The flange on the plate A is to enter the hand-hole, gage the position of the plate, and prevent such plate from being turned out of place. The flange also answers as a support for the packing.

The groove in the shank is an essential feature, as without it the shank, in order to admit of the passage of the cap B through the hand-hole, could not generally be made of sufficient diameter to receive the key and resist the strain and wear to which it is subjected.

What I claim as my invention is—

The combination and arrangement of the perforated oblong or elliptical cover D, as described, with the oblong or elliptical cover B and the shank $f$, mortised and grooved as described, all being for use for the purpose and in manner as explained.

WM. W. GRAHAM.

Witnesses:
   R. H. EDDY,
   J. R. SNOW.